Patented Feb. 15, 1944

2,341,550

UNITED STATES PATENT OFFICE 2,341,550

BEARING

Franz R. Hensel, Indianapolis, Ind., assignor to P. R. Mallory & Co., Inc., Indianapolis, Ind., a corporation of Delaware No Drawing. Application July 14, 1942,
Serial No. 450,913

5 Claims. (Cl. 308—242)

The present invention relates to bearing compositions.

It is an object of the invention to provide a bearing material of high corrosion resistance.

Another object of the invention is the provision of a new bearing composition having a high fatigue strength.

It is a further object of the invention to provide a new bearing composition having a very low coefficient of friction.

Other objects of the invention will be apparent from the following description, taken in connection with the appended claims.

The present invention comprises the combination of elements, and the product thereof, brought out and exemplified in the disclosure hereinafter set forth, the scope of the invention being indicated in the appended claims.

While a preferred embodiment of the invention is described herein, it is contemplated that considerable variation may be made in the method of procedure and the combination of elements, without departing from the spirit of the invention.

According to the present invention, an improved bearing composition is contemplated, having the following ingredients present in the substantial range of proportions by weight, given below:

| | Per cent by weight |
|---|---|
| Gold | 65 to 99 |
| Lead | 1 to 35 |

Alloys falling within this composition range will consist of a mixture of gold and a gold-lead compound containing 34.4% lead, balance gold. Alloys within the range specified above will have a liquid phase at 418° C. There occurs a peritectic reaction at that temperature and by having more than 35% lead present, a liquid phase would appear as low as 254° C. For high duty bearings, it is necessary that the melting point of the low temperature constituent should be sufficiently high so that in service, the bearings will not disintegrate, due to partial melting. On the other hand, a bearing material having two constituents of different melting points is of advantage, because it eliminates the danger of scoring, and failure of the bearings if the oil supply should be temporarily shut off.

In the prior art, alloys have been used, consisting of copper and lead, and silver and lead. In this case the low melting point phase was liquid at the melting point of lead, which was 327° C., because neither copper nor silver form alloys with lead. This is different in the case of gold and lead. The formation of an alloy at elevated temperatures greatly improves the homogeneity of the alloys. While in silver-lead or in copper-lead, a mechanical stirring and mixing operation is necessary to keep the lead particles small and very uniformly distributed, in the gold-lead system, an inherent metallurgical reaction provides a matrix of pure gold with lead-gold compound particles distributed within said matrix. Therefore, the structure created by the peritectic reaction shows a microscopical distribution of the two ingredients. One of these ingredients is gold, which is a very soft material, having in the annealed condition a Brinell hardness of only about 30, and at the same time having a thermal conductivity higher than that of most of the metals and being approximately as high as 70 to 75% that of copper or silver. Furthermore, gold is not attacked by sulphur or by any corrosive mediums that are dangerous to bearings which run at elevated temperatures.

The new bearing alloys can be prepared by standard methods, such as casting, centrifugal casting, electroplating, spraying or any other means. In the preferred construction the bearing alloy is cast, plated or sprayed as a lining on a steel shell or half shells. It is contemplated for use as an internal combustion engine bearing as well as for other applications. In engines it will generally be operated against steel.

While in the bearings of the prior art, lead was present as the metallic element, in the bearing material of the present invention, lead is present as an intermetallic compound of gold and lead. This compound has a preponderant amount of gold present which imparts to it a much higher corrosion resistance than is obtainable in pure lead. Therefore, the present alloys will withstand severe service without the necessity of having a corrosion resistant surface protection.

Another advantage of the alloy is the protective influence of the lead against alloy formation between gold and steel. Gold has some tendency to alloy with steel when used against it as a bearing. It appears that with a gold-lead alloy bearing the lead greatly reduces the tendency toward alloy formation, since lead and steel are practically insoluble in each other.

While the present invention as to its objects and advantages has been described herein, as carried out in specific embodiments thereof, it is not desired to be limited thereby, but it is the intention to cover the invention broadly, within the spirit and scope of the appended claims.

What is claimed is:

1. A bearing comprising gold and lead, wherein the lead content does not exceed 35%, said bearing material being characterized by a low melting point phase, becoming molten at a temperature of about 418° C., and said bearing composition being characterized by a peritectic structure consisting of a gold matrix and a secondary phase consisting of a compound of gold and lead.

2. A bearing lining formed of an alloy of gold 65 to 99% and lead 1 to 35%.

3. In a bearing structure, a layer of bearing alloy comprising 1 to 35% lead, balance substantially all gold.

4. A bearing comprising a steel backing and a lining of bearing alloy bonded thereto formed of 1 to 35% lead, balance substantially all gold.

5. A bearing combination comprising cooperating bearing surfaces, one of said surfaces being formed of steel, the other of said surfaces being formed of an alloy comprising 1 to 35% lead and the balance substantially all gold.

FRANZ R. HENSEL.